United States Patent [19]
Hutchins et al.

[11] Patent Number: 5,609,242
[45] Date of Patent: Mar. 11, 1997

[54] STEEL CABLE CONVEYOR BELT WITH IMPROVED PENETRATION AND RIP RESISTANCE

[75] Inventors: Thomas G. Hutchins, Uniontown, Ohio; Herbert L. Terreau, Oshawa, Canada

[73] Assignee: The Goodyear Tire & Rubber Company, Akron, Ohio

[21] Appl. No.: 501,527

[22] Filed: Jul. 12, 1995

[51] Int. Cl.⁶ .................................................. B65G 15/34
[52] U.S. Cl. .................................................. 198/847
[58] Field of Search .................................. 198/846, 847

[56] References Cited

U.S. PATENT DOCUMENTS

| | | | |
|---|---|---|---|
| 3,973,670 | 8/1976 | Spaar | 198/847 |
| 4,411,947 | 10/1983 | Heynhold | 198/847 X |
| 4,650,068 | 3/1987 | Vanassche et al. | 198/847 |

FOREIGN PATENT DOCUMENTS

| | | | |
|---|---|---|---|
| 2520943 | 5/1975 | Germany | 198/847 |
| 2532190 | 1/1977 | Germany | 198/847 |
| 2557025 | 6/1977 | Germany | 198/847 |
| 5139516 | 6/1993 | Japan | 198/847 |
| 1146046 | 3/1969 | United Kingdom | 198/847 |
| 1240123 | 7/1971 | United Kingdom | 198/847 |

*Primary Examiner*—James R. Bidwell
*Attorney, Agent, or Firm*—J. D. Wolfe; M. R. Dion, Sr.

[57] ABSTRACT

A steel wire or cable conveyor belt with improved penetration and rip resistance is made by plying up a series of rubberized longitudinal steel cables or wires to give a core, placing a ply of rubberized woven fabric such as polyaramide or nylon over the core, such as a tire breaker ply or plies over the core, then a ply of rubberized closely placed, essentially in contact wire, preferably of heavy tire ply cable, such as an earth mover ply, cut to cover the core in transverse direction to allow the steel wire or cable to be positioned perpendicular over the longitudinal steel wire or cable, apply a cover stock ply over the transversely positioned short wire or cable. The underside of the longitudinal steel wire or cable core has a rubberized woven fabric positioned there beneath and a rubberized pulley ply beneath the woven fabric ply. The plied up belt is cured with pressure and heat to adhere the plies together and cure the rubber. The usual belt cure pressure of 200 to 500 psi and temperatures of about 140° C. to about 160° C. for about 30 to about 90 minutes can be used, depending on the curative.

8 Claims, 1 Drawing Sheet

STEEL CABLE CONVEYOR BELT WITH IMPROVED PENETRATION AND RIP RESISTANCE

TECHNICAL FIELD

This invention relates to an improvement in steel or wire cable conveyor belts to offer greater resistance to penetration by rocks, shale, tramp metal or other unknown objects which drop on the belt during service. More particularly, this invention relates to a method and its product to improve the resistance to ripping of a steel or wire cable conveyor belt should an object penetrate through the belt, remain lodged in the belt and then become stuck against some unknown fixed object such as a conveyor or idler frame.

The process of this invention calls for the use of a layer or layers of closely packed transversely positioned steel cable positioned above a core comprising longitudinal cable or wire of the rubberized belt. Thus, the belt of this invention comprises a rubberized series of longitudinal steel cables or wires having a series of rubberized transversely packed steel cable or wires essentially in contact positioned on top of the rubberized longitudinal cable or wire member which is the load carrying wires or cables of the belt with a cover ply or plies on top of the belt and a pulley ply or plies on the bottom of the core of the belt. In this process a ply or plies of closely spaced steel wires or cables are applied above the plane of the belt carrying longitudinal wires or cables but perpendicular to the direction of those load carrying wires or cables so as to not adversely impact the troughability of the belt. A second ply of closely spaced steel wires or cables or ply of fabric below the plane of the belt's load carrying longitudinal wires or cables may be provided to afford resistance to transverse movement of the load carrying cables or members from the impact loads on the top cover of the belt. Of course, the size, strength and density of the steel wires or cables in the ply or plies and the type of fabric utilized are to be selected to provide the degree of strength and improvement in penetration and rip resistance required by the severity of the application such as a belt for conveying tar sands or lump of coal.

BACKGROUND ART

Steel wires or cables or a ply of fabric above or below the load carrying wire or cable of the conveyor belt to provide improved resistance to cutting and gouging of the covers from rock, shale, coal or tramp metal and to improve the rip resistance of such belts are on the market. However, these commercial belts do not provide a high degree of resistance to penetration by such objects. When the object penetrates the belt, these belts exhibit inferior abuse resistance and tends to tear apart longitudinally. Also, relative to their cost, the life of these belts is materially effected by their poor resistance to penetration and tear.

SUMMARY OF THE INVENTION

This invention provides significant improvements in steel wire or cable belts by using transversely located series of steel wires or cables, preferably essentially in contact, located above the load carrying longitudinal steel wire or cable to provide resistance to transverse movement of the load carrying cables or wires and afford satisfactory troughability. Of course, these perpendicular located or positioned steel wires or cables are preferably separated at least by an insulating or adhesive rubber layer or coating to bind the two together. Also, a breaker stock may be used to absorb the load impact on these perpendicular layers of steel wire or cable. The breaker strips maybe placed above and below the core of the belt which generally comprises a series of rubberized longitudinal parallel steel wires or cables with rubberized, insulation layers on each side. There is on top and bottom of each belt respectively a top cover member and a pulley member.

The rubber used in these belts are any of those generally used in belts or tires but each of the belt has those rubbers that are preferred for its uses. For examples, acrylonitrile/butadiene rubber is often used for the belts to carry tar sands and related materials, while natural rubber and/or butadiene/styrene based compound rubbers may be used for sand or coal and like handling.

The nature of this invention may be more readily seen and understood by reference to the drawings where:

DRAWINGS

Figure 1:
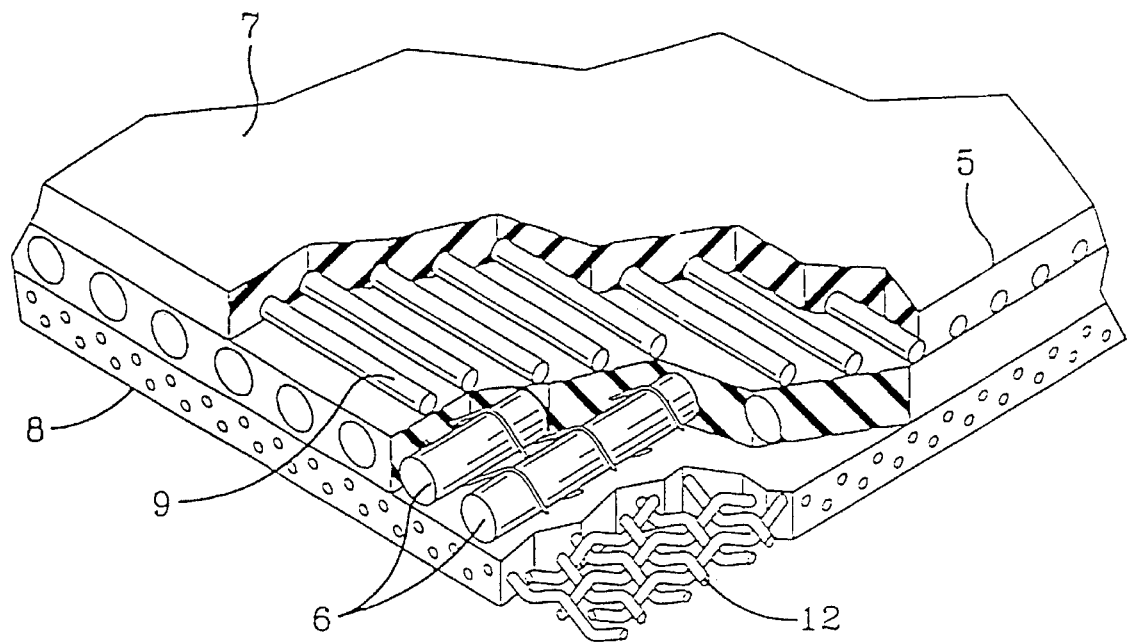
FIG. 1 is a partial perspective view of a piece of belt showing the belt along a cut end such as where a joint must be made.
Figure 2:
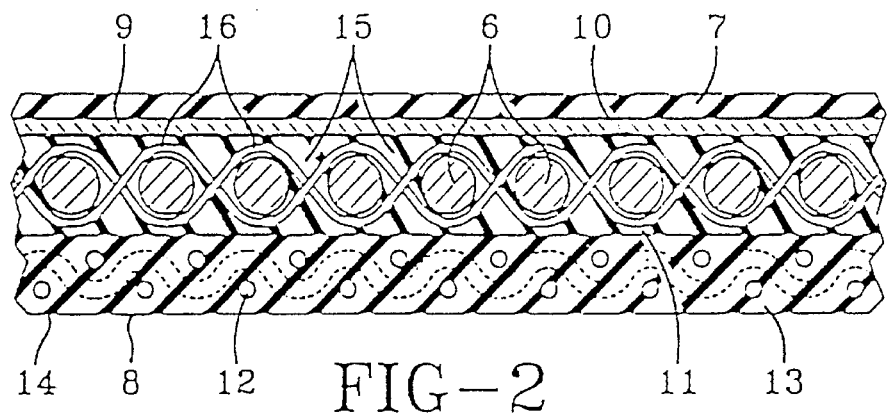
FIG. 2 is a cross-sectional vertical view along the end of a belt.
Figure 3:
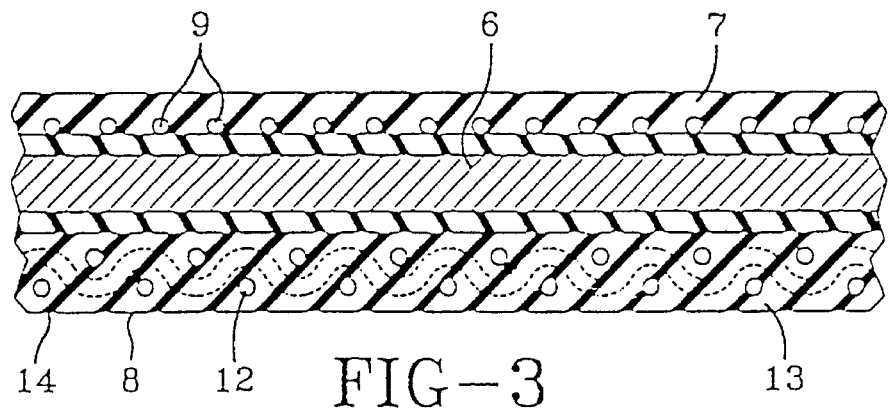
FIG. 3 is a vertical side view of the belt.

Referring again to the drawings, numeral 5 designates the belt, and in FIG. 3 the longitudinal steel cable 6 is shown with a load cover stock 7 above and a pulley stock 8 below the longitudinal cable. The number 9 designates the individual steel cable of the transverse or perpendicular positioned steel cable 10 positioned above the layer 6 of longitudinal steel cable. The longitudinal steel cables 6 are covered or embedded in a rubber compound 15 sufficient to absorb the shock of the material being handled and reduce contact between the wire. The transverse cable 10 is likewise surrounded by a rubber coating. The load cover stock 7 is positioned above the transverse cable 10 as shown in the drawings numeral 16 represents the series of alternating twisted fabric that extends around the wire or cable 6 to the next wire or cable as shown in FIG. 2.

Beneath the longitudinal cable 6 is located preferably at least one layer of a rubberized fabric 12 or breaker. A pulley layer or cover 14 is applied as normally used in belts.

The fabric or breaker layer beneath the longitudinal steel wire or cables with the use of the perpendicular layer of transverse steel wire or cables permits the belt to more readily trough but also affords bounce that gives the belt improved bounce reaction to impact loads, which appears to reduce the overall penetration of the stray loads.

Penetration Tests

The penetration tests were conducted using a tungsten carbide steel blade sharpened to an angle of 60° fitted to the underside the 31.8 Kg weight. The blade/weight was dropped onto the belt from 4.11 meters, resulting in 1150 joules of force. The belt was held in a frame at a 45° angle with respect to the line of travel of the blade and positioned such that the blade struck the belt section between adjacent belt tension cables.

Test Ratings

The rating system for the penetration test is based on the average of the sum of the length of cuts on the top cover and pulley covers, (C1+C2)/2) expressed in millimeters to give a penetration value.

Rip Tests

The rip tests were conducted using a hydraulic test bed fitted with a strain transducer.

One end of the belt was held in position using a specially designed jig while the force ram pulled a 7 mm wide by 25 mm long blade through the belt. The blade was held upright and rigid in a yoke fixed to the force ram.

The rating system for the rip resistance is the maximum force recorded during the 90-110 seconds of pull.

Dividing the maximum rip force by the penetration value provides an ABUSE index. The higher the abuse index, the better the belt is.

Experimental Belt Descriptions

A number of experimental belts were made and tested by penetration test and rip test given herein. Also, the belts of this invention were compared with the commercial belts.

A number of experimental belts were made using ST3300 steel cable covered with 12 mm×10 mm covers of acrylonitrile/butadiene rubber based cover stock as the core. This core was modified as indicated in Table 1 for the different experimental belts. The core was modified by plying up to place, between the rubberized longitudinal steel cable and the covers, a ply as listed above and below the longitudinal steel cables and the pulley cover as listed below from AA to AD.

The experimental belts evaluated were based on a ST3300 steel cable conveyor belt with 12 mm×10 mm covers of NBR based cover stocks.

| BELT AA | 1 ply NR12000 fabric above longitudinal cables |
| --- | --- |
|  | 1 ply NR12000 fabric below cables |
| BELT AB | 1 ply NR10000 fabric above cables |
|  | 1 ply NR10000 fabric below cables |
| BELT AC | 1 ply HD30 steel cords above cables |
|  | 1 ply NR12000 fabric below cables |
| BELT AD | 1 ply HR30 steel cords above cables; and only pulley cover belts |

NBR is an acrylonitrile butadiene rubber, HR 1200 and 1000 are rubber coated woven fabric and HD30 is a rubberized steel wire tire ply cut to cover the belt's core.

TABLE 1

| Belt ID | Lengths of Cut | | | Rip Force Lbs | Abuse Factor |
| --- | --- | --- | --- | --- | --- |
|  | Top C1 | Pulley C3 | Ave | | |
| Belt AA-1 | 114.2 | 43.4 | 78.8 | 10920 | |
| Belt AA-2 | 123.2 | 42.9 | 83.6 | 8500 | |
|  |  |  | (81.2) | (9710) | 119 |
| Belt AB-1 | 123.9 | 45.4 | 84.6 | 8150 | |
| Belt AB-2 | 117.2 | 43.0 | 80.1 | 7360 | |
| Belt AB-3 | 124.2 | 47.8 | 86.0 |  | |
|  |  |  | (83.6) | (7755) | 92 |
| Belt AC-1 | 59.7 | 0.0 | 29.9 | 10830 | |
| Belt AC-2 | 58.5 | 0.0 | 29.3 | 9870 | |
|  |  |  | (29.5) | (10350) | 351 |
| Belt AD-1 | 79.6 | 0.0 | 39.8 | 10270 | |
| Belt AD-2 | 62.2 | 0.0 | 31.1 | 12740 | |
|  |  |  | (35.4) | (11505) | 325 |

Comparative tests results on commercial conveyor belts are shown below in Table 2.

TABLE 2

| Belt ID | Length of Cuts | | | Rip Force Lbs | Abuse Factor |
| --- | --- | --- | --- | --- | --- |
|  | Top C1 | Pulley C2 | Ave | | |
| ST5000 (No breakers) | 182.9 | 144.5 | 163.7 | 7250 | 44 |
| ST2000 (2 Leno breakers in top cover) | 181.4 | 104.3 | 142.9 | 9400 | 65 |
| ST3300 (HS nylon top and pulley) | 124.0 | 56.1 | 90.1 | 12130 | 134 |
| Goodyear A (1 Ply large diameter steel cords in top cover) | 68.4 | 0.0 | 34.2 | 8670 | 255 |
| Goodyear B (1 Ply small diameter steel cords in top cover) | 88.8 | 0.0 | 44.4 | 5180 | 116 |

The belts of Tables 1 and 2 were tested by penetration and rip tests. Table 2 is test value on commercial belts which shows the inferior penetration and abuse factor of the prior art belts relative to invention belts AC and AD of this invention.

It has been found that use of tire members 16, such as the fine steel wire or thread extended around the individual steel wire or cord as shown in FIG. 2, not only facilitates the handling, rubberizing and placing the steel wire or cable plies relative to each other and also offers resistance to penetration and tear of the belt a rubberized steel wire heavy duty earthmover stock that can be cut to size such as the width of the belt, cut said stock and ply it on the belt core perpendicular to longitudinal wire of the core to build the belt of this invention when cured.

While certain representative embodiments and details have been shown for the purpose of illustrating the invention, it will be apparent to those skilled in this art that various changes and modifications may be made therein without departing from the spirit or scope of the invention.

What is claimed is:

1. A cured conveyor belt that exhibits superior resistance to penetration and tear testing comprised of a core member having a series of rubberized closely along side parallel longitudinal steel wires or cables, covered on each side with rubber layer, at least the least on top side of the longitudinal wire or cable one layer of a rubberized closely spaced series of transversely positioned steel wires or cables adhered above the core, a rubberized fabric breaker adhered below the core, an upper cover suitable for carrying a load and pulley cover beneath said core.

2. The conveyor belt of claim 1 wherein the longitudinal positioned steel wire or cable is surrounded with a series of alternating twisted fabric cords which extends round each wire to the next wire.

3. The conveyor belt of claim 2 wherein the fabric cord is polyaramide.

4. A method of making a heavy duty penetration and tear resistant steel wire or cable conveyor belt composed of a series of plied up layers cured together to give a belt composed of (1) a pulley cover layer adhered to (2) a rubberized fabric stock that is adhered hereto, and (3) a core member composed of a series of closely side-by-side rubberized parallel longitudinal steel wire or cable, said core member having a rubberized fabric stock adhered to its topside and a layer of short essentially in contact parallel steel wire or cable located transversely above said core member and adhered to said rubberized fabric stock, a cover stock adhered to said transversely located short steel wire or cable layer.

5. The method of making an improved penetration and tear resistant conveyor belt of claim 4 wherein the plied up belt is cured at about 200 to 500 psi at about 140° F. to 160° F. from 30 to 90 minutes.

6. The method of claim 4 wherein the short wire layer is made by cutting a rubberized steel wire heavy duty earthmover stock to width of said belt and placing said cut earthmover stock on said core member to run perpendicular to longitudinal wire of the core.

7. The method of claim 4 wherein the rubberized fabric is woven polyaramide fabric.

8. The conveyor belting of claim 2 wherein the fabric breaker is woven.

* * * * *